US008974062B2

(12) United States Patent
Lin et al.

(10) Patent No.: US 8,974,062 B2
(45) Date of Patent: Mar. 10, 2015

(54) PROJECTION APPARATUS

(71) Applicants: Tsung-Ching Lin, Hsin-Chu (TW);
Te-Tang Chen, Hsin-Chu (TW);
Wen-Yen Chung, Hsin-Chu (TW)

(72) Inventors: Tsung-Ching Lin, Hsin-Chu (TW);
Te-Tang Chen, Hsin-Chu (TW);
Wen-Yen Chung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 122 days.

(21) Appl. No.: 13/645,475

(22) Filed: Oct. 4, 2012

(65) Prior Publication Data
US 2013/0250250 A1 Sep. 26, 2013

(30) Foreign Application Priority Data

Mar. 23, 2012 (CN) .......................... 2012 1 0079309

(51) Int. Cl.
*G03B 21/26* (2006.01)
(52) U.S. Cl.
USPC .................... 353/57; 353/31; 353/94; 353/98
(58) Field of Classification Search
USPC ........... 353/30, 31, 37, 52, 57, 58, 60, 61, 94, 353/98, 99; 362/84, 85, 227, 231, 243, 362, 362/800; 372/34, 36, 43.01; 349/5, 7–9
See application file for complete search history.

(56) References Cited

U.S. PATENT DOCUMENTS

| 6,739,831 | B2* | 5/2004 | Hsu et al. ........................ 415/60 |
| 7,144,118 | B2 | 12/2006 | Hsu et al. |
| 8,322,861 | B2* | 12/2012 | Tsai et al. ...................... 353/57 |
| 2003/0043584 | A1 | 3/2003 | Hsu et al. |
| 2005/0157269 | A1* | 7/2005 | Seto et al. ........................ 353/61 |
| 2006/0082732 | A1* | 4/2006 | Miwa et al. ..................... 353/57 |
| 2007/0115438 | A1* | 5/2007 | Tsubura ......................... 353/57 |
| 2007/0258053 | A1 | 11/2007 | Hsu et al. |
| 2008/0252858 | A1 | 10/2008 | Zheng et al. |
| 2009/0207382 | A1 | 8/2009 | Hsiao et al. |
| 2010/0066979 | A1* | 3/2010 | Miyazaki ........................ 353/52 |
| 2010/0110393 | A1 | 5/2010 | Chen et al. |
| 2011/0032490 | A1* | 2/2011 | Hsiao et al. .................... 353/58 |
| 2011/0181842 | A1 | 7/2011 | Kanno et al. |
| 2011/0317131 | A1* | 12/2011 | Miyazaki ........................ 353/31 |
| 2012/0262677 | A1* | 10/2012 | Ogino et al. .................... 353/31 |

FOREIGN PATENT DOCUMENTS

| CN | 1825201 | 8/2006 |
| CN | 101726979 | 6/2010 |
| TW | 514350 | 12/2002 |
| TW | 200811584 | 3/2008 |
| TW | I322921 | 4/2010 |

OTHER PUBLICATIONS

"Office Action of China Counterpart Application", issued on Nov. 15, 2014, p. 1-p. 7.

* cited by examiner

*Primary Examiner* — Sultan Chowdhury
(74) *Attorney, Agent, or Firm* — Jianq Chyun IP Office

(57) ABSTRACT

A projection apparatus including a casing, a light source module, a fan, and a light engine module is provided. The casing has an inlet and an outlet. The light source module is disposed in the casing and is adjacent to the inlet. The fan is disposed in the casing and is adjacent to the outlet, and is configured to provide a heat dissipation airflow. The light engine module is disposed in the casing and is located between the fan and the light source module, and the heat dissipation airflow sequentially flows through the inlet, the light source module, the light engine module, the fan, and the outlet. The fan is disposed between the light engine module and the outlet.

14 Claims, 2 Drawing Sheets

PROJECTION APPARATUS

CROSS-REFERENCE TO RELATED APPLICATION

This application claims the priority benefit of China application serial no. 201210079309.5, filed on Mar. 23, 2012. The entirety of the above-mentioned patent application is hereby incorporated by reference herein and made a part of this specification.

BACKGROUND OF THE INVENTION

1. Field of the Invention

The invention relates to an optical device. Particularly, the invention relates to a projection apparatus.

2. Description of Related Art

A projection apparatus is a display apparatus used for producing large size images. An imaging principle of the projection apparatus is to convert a light beam generated by a light source into an image beam through a light valve, and then converts the image beam into a projection beam through a projection lens, and projects the projection beam onto a screen or a wall. With development of the projection technique and reduction of fabrication cost, utilization of the projection apparatus is gradually developed from commercial use to domestic use.

Along with increasing demands in carbon reduction and green energy, in the projection apparatus, a solid state illumination (SSI) is gradually used to replace a conventional high pressure mercury lamp, the solid state light source is, for example, a light-emitting diode (LED) light source or a laser diode light source. Generally, a blu-ray solid state light source, a green-ray solid state light source and a red-ray solid state light source are configured in the projection device, and since the temperature may greatly influence a lighting efficiency of the solid state light source, a plurality of fans are generally disposed near the solid state light sources for directly providing heat dissipation airflows to the solid state light sources. However, such design leads to a higher production cost due to relatively more fans, and leads to a larger size of the projection apparatus. Moreover, according to the above configuration, the fans are generally disposed at an air inlet of the projection apparatus, i.e. an upstream of a flow field of the heat dissipation airflow in internal of the projection apparatus, so that it is uneasy to control a flow field direction of the heat dissipation airflow, which is liable to cause a flow field chaos and cause a high temperature of the devices at a downstream of the system flow field.

In U.S. Publication No. 20110181842, an LED light source is disposed between two fans. In U.S. Publication No. 20100110393, a fan is disposed aside an LED light source. U.S. Publication No. 20080252858 discloses a projection apparatus, in which a fan is disposed at a side of a lamp module. In U.S. Publication No. 20030043584, a fan is disposed at a side of a lamp module. U.S. Publication No. 20090207382 discloses a projection system, in which an airflow generated by a fan is used to guide and exhaust the heat generated by an optical module. U.S. Pat. No. 7,144,118 discloses a projection apparatus having an air inlet and a fan, in which the fan is used to guide external air into the projector to flow through heating elements. However, heat dissipation effects of the aforementioned patents are still limited.

SUMMARY OF THE INVENTION

The invention is directed to a projection apparatus with greatly improved heat dissipation efficiency.

Additional aspects and advantages of the invention will be set forth in the description of the techniques disclosed in the invention.

To achieve one of or all aforementioned and other advantages, an embodiment of the invention provides a projection apparatus including a casing, a light source module, a fan, and a light engine module. The casing has an inlet and an outlet. The light source module is disposed in the casing and is adjacent to the inlet. The fan is disposed in the casing and is adjacent to the outlet, and is configured to provide a heat dissipation airflow. The light engine module is disposed in the casing and is located between the fan and the light source module, and the heat dissipation airflow sequentially flows through the inlet, the light source module, the light engine module, the fan, and the outlet, and the fan is disposed between the light engine module and the outlet.

According to the above descriptions, the fan and the light source module are respectively disposed at the outlet and the inlet, and the light engine module is disposed between the fan and the light source module, so that after the heat dissipation airflow generated by the fan enters the casing from the inlet, the heat dissipation airflow sequentially flows through the light source module and the light engine module for cooling the light source module and the light engine module, and then the heat dissipation airflow is exhausted by the fan through the outlet. Since the heat dissipation airflow sequentially flowing through a plurality of components within the casing could be generated by a single fan at the outlet, the manufacturing cost is saved, and the size of the projection apparatus is reduced. Moreover, since the fan is configured at the outlet and is located at a downstream of a flow field of the heat dissipation airflow within the casing, it is easy to control a flow field direction of the heat dissipation airflow to improve the heat dissipation efficiency.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
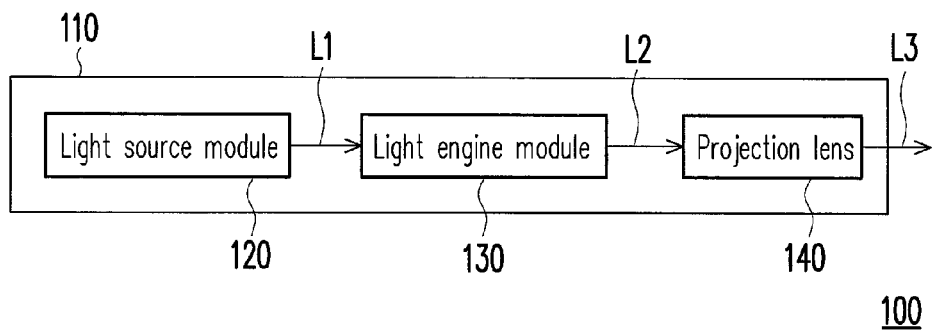
FIG. 1 is a block diagram of a projection apparatus according to an embodiment of the invention.

Referring to FIG. 1, the projection apparatus 100 of the embodiment includes a casing 110, a light source module 120, a light engine module 130, and a projection lens 140. The light source module 120 is configured to provide an illumination beam L1. The light engine module 130 is configured to convert the illumination beam L1 into an image beam L2. The projection lens 140 is configured to convert the image beam L2 into a projection beam L3, and projects the projection beam L3 to form an image.

Figure 2:
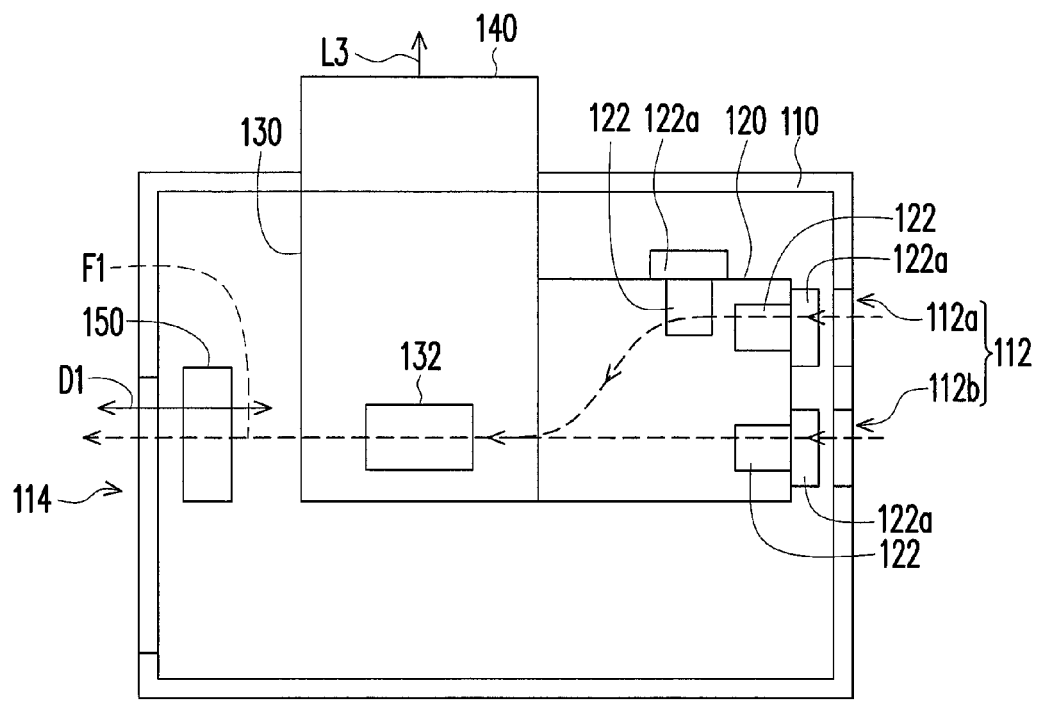
FIG. 2 is a top view of the projection apparatus of FIG. 1.

Referring to FIG. 2, the projection apparatus 100 further includes a first fan 150, and the light source module 120, the light engine module 130, and the first fan 150 are all disposed in the casing 110. The casing 110 has an inlet 112 and an outlet 114. The light source module 120 is disposed adjacent to the inlet 112. The first fan 150 is disposed adjacent to the outlet 114, and is configured to provide a first heat dissipation airflow F1. The light engine module 130 is disposed between the first fan 150 and the light source module 120, and the heat dissipation airflow F1 exhausted by the first fan 150 sequentially flows through the inlet 112, the light source module 120, the light engine module 130, the first fan 150, and the outlet 114, and the first fan 150 is disposed between the light engine module 130 and the outlet 114.

According to the above configuration, after the first heat dissipation airflow F1 generated by the first fan 150 enters the casing 110 from the inlet 112, the first heat dissipation airflow F1 sequentially flows through the light source module 120 and the light engine module 150 for cooling the light source module 120 and the light engine module 130, and then the first heat dissipation airflow F1 is exhausted by the first fan 150 through the outlet 114. Since the first heat dissipation airflow F1 sequentially flowing through a plurality of components within the casing 110 could be generated by a single fan at the outlet 114, the manufacturing cost is saved, and the size of the projection apparatus 100 is reduced. Moreover, since the first fan 150 is configured at the outlet 114 and is located at a downstream of a flow field of the first heat dissipation airflow F1 within the casing 110, it is easy to control a flow field direction of the first heat dissipation airflow F1 to improve the heat dissipation efficiency.

Referring to FIG. 1 and FIG. 2, at least one of an extending direction of a flow path of the first heat dissipation airflow F1 flowing through the light engine module 130 and an axial direction D1 of the first fan 150 is not parallel to an extending direction of the projection beam L3, so as to improve the heat dissipation efficiency. In an exemplary embodiment, at least one of the extending direction of the flow path of the first heat dissipation airflow F1 flowing through the light engine module 130 and the axial direction D1 of the first fan 150 is perpendicular to the extending direction of the projection beam L3, so as to improve the heat dissipation efficiency. For example, the extending direction of the flow path of the first heat dissipation airflow F1 flowing through the light engine module 130 and the axial direction D1 of the first fan 150 are, for example, perpendicular to the extending direction of the projection beam L3, though the invention is not limited thereto. Namely, only the extending direction of the flow path of the first heat dissipation airflow F1 flowing through the light engine module 130 may be designed to be perpendicular to the extending direction of the projection beam L3, or only the axial direction D1 of the first fan 150 may be designed to be perpendicular to the extending direction of the projection beam L3.

In the embodiment, optical devices in the light engine module 130 could be cooled, where the optical devices are well known by those skilled in the art such as a light valve, a light uniforming element, a lens, a reflector, etc., and a light valve 132 of the light engine module 130 is described below, though the invention is not limited thereto. The light valve 132 is, for example, a digital micro-mirror device (DMD), and is configured to convert the illumination beam L1 of FIG. 1 into the image beam L2. As shown in FIG. 2, the light valve 132 is located on the flow path of the first heat dissipation airflow F1, so that the first heat dissipation airflow F1 could cool down the light valve 132. However, in other embodiments, the first fan 150 could be disposed adjacent to the light valve 132, so that the first heat dissipation airflow F1 provided by the first fan 150 could sufficiently cool down the light valve 132.

Moreover, the light source module 120 of the embodiment includes a plurality of solid state light sources 122, and since the solid state light sources 122 are located on the flow path of the first heat dissipation airflow F1, the first heat dissipation airflow F1 could cool down the solid state light sources 122. In the embodiment, the inlet 112 includes a plurality of sub inlets (for example, a sub inlet 112a and a sub inlet 112b). The sub inlet 112a and the sub inlet 112b respectively correspond to at least a part of the solid state light sources 122 (for example, corresponding to two solid state light sources 122 in the right side of FIG. 2), and the external air is driven by the first fan 150 to enter the casing 110 through the sub inlet 112a and the sub inlet 112b, and respectively flows through the solid state light sources 122. In other embodiments, the inlet 112 may be a single opening and has a large width to cover a plurality of the solid state light sources 122, which is not limited by the invention.

The three solid state light sources 122 shown in FIG. 2 are, for example, respectively a blue light source, a green light source, and a red light source. Each of the solid state light sources 122 could be a light-emitting diode (LED) light source, a laser diode light source or other suitable solid state light sources, or a combination of a part of the LED light sources and a part of the laser diode light sources, which is not limited by the invention. Moreover, each of the solid state light sources 122 of the embodiment may further have a heat dissipation fin set 122a for improving the heat dissipation efficiency.

Figure 3:
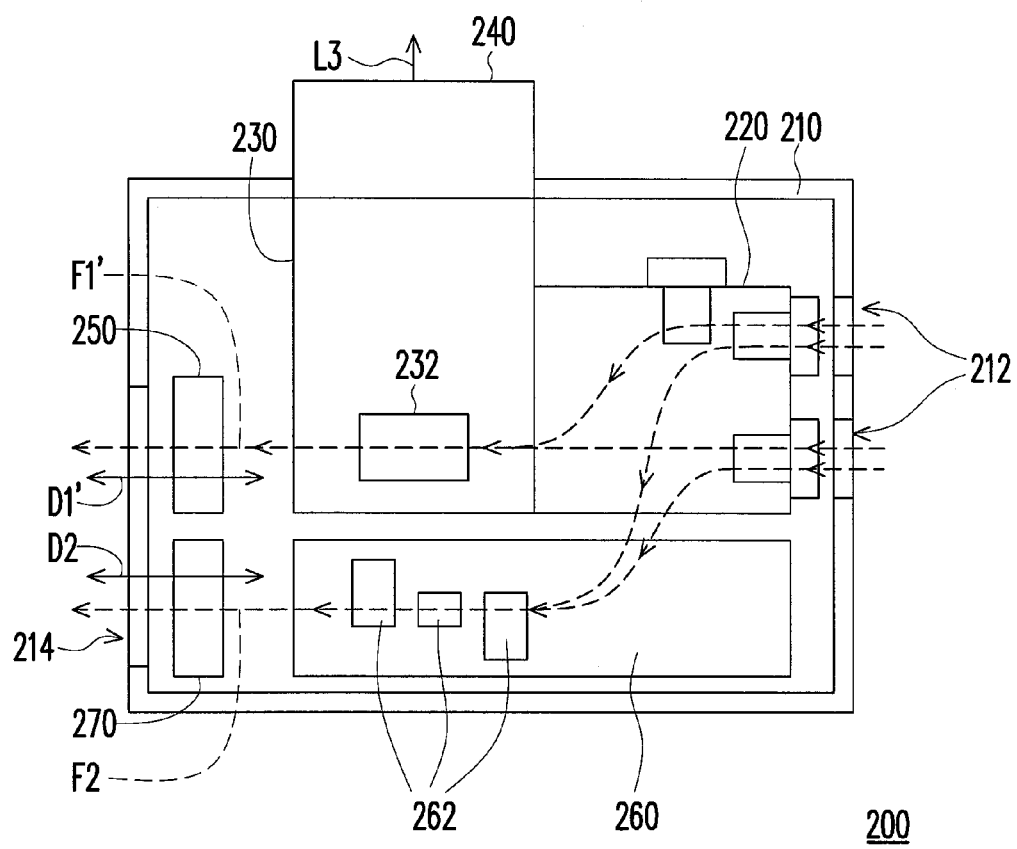
FIG. 3 is a top view of a projection apparatus according to another embodiment of the invention.

Referring to FIG. 3, in the projection apparatus 200 of the embodiment, a casing 210, a light source module 220, a light engine module 230 (the optical device in the light engine module 230 is represented by a light valve 232, though a component structure of the light engine module is not limited thereto), a projection lens 240, a first fan 250, and a first heat dissipation airflow F1' generated by the first fan 250 are similar to the casing 110, the light source module 120, the light engine module 130, the projection lens 140, the first fan 150, and the first heat dissipation airflow F1 generated by the first fan 150 of FIG. 2, which are not repeated. A main difference between the projection apparatus 200 of the embodiment of FIG. 3 and the projection apparatus 100 of FIG. 2 is that the projection apparatus 200 further includes a circuit board module 260 and a second fan 270. The circuit board module 260 is disposed in the casing 210 and has a plurality of electronic elements 262. The second fan 270 is disposed in the casing 210, and is located adjacent to an outlet 214 and corresponding to the circuit board module 260. The second fan 270 is configured to provide a second heat dissipation airflow F2, and the second heat dissipation airflow F2 sequentially flows through an inlet 212, the light source module 220, the circuit board module 260, the second fan 270, and the outlet 214 for cooling the light source module 220 and the electronic elements 262 on the circuit board module 260, so that the projection apparatus 200 has better heat dissipation efficiency.

Referring to FIG. 1 and FIG. 3, at least one of an extending direction of a flow path of the second heat dissipation airflow F2 flowing through the circuit board module 260 and an axial direction D2 of the second fan 270 is not parallel to an extending direction of the projection beam L3, so as to improve the heat dissipation efficiency. In an exemplary embodiment, at least one of the extending direction of the flow path of the second heat dissipation airflow F2 flowing through the circuit board module 260 and the axial direction D2 of the second fan 270 is perpendicular to the extending direction of the projection beam L3, so as to improve the heat dissipation efficiency. For example, the extending direction of the flow path of the second heat dissipation airflow F2 flowing through the circuit board module 260 and the axial direction D2 of the second fan 270 are, for example, perpendicular to the extending direction of the projection beam L3, though the invention is not limited thereto. Namely, only the extending direction of the flow path of the second heat dissipation airflow F2 flowing through the circuit board module 260 may be designed to be perpendicular to the extending direction of the projection beam L3, or only the axial direction D2 of the second fan 270 may be designed to be perpendicular to the extending direction of the projection beam L3.

According to the above descriptions, in the embodiment, the extending direction of the flow path of the first heat dissipation airflow F1' flowing through the light engine module 230 and the axial direction D1' of the first fan 250 are, for example, perpendicular to the extending direction of the projection beam L3, and the extending direction of the flow path of the second heat dissipation airflow F2 flowing through the circuit board module 260 and the axial direction D2 of the second fan 270 are, for example, perpendicular to the extending direction of the projection beam L3, though the invention is not limited thereto.

In summary, embodiments of the invention have at least one of the following advantages. In the embodiments of the invention, the fan and the light source module are respectively disposed at the outlet and the inlet, and the light engine module is disposed between the fan and the light source module, so that after the heat dissipation airflow generated by the fan enters the casing from the inlet, the heat dissipation airflow sequentially flows through the light source module and the light engine module for cooling the light source module and the light engine module, and then the heat dissipation airflow is exhausted by the fan through the outlet. Since the heat dissipation airflow sequentially flowing through a plurality of components within the casing could be generated by a single fan located at the outlet, the manufacturing cost is saved, and the size of the projection apparatus is reduced. Moreover, since the fan is configured at the outlet and is located at a downstream of a flow field of the heat dissipation airflow within the casing, it is easy to control a flow field direction of the heat dissipation airflow to improve the heat dissipation efficiency.

In addition, in the other embodiment of the invention, the fan could be disposed adjacent to the light engine module, so that the first heat dissipation airflow provided by the fan could sufficiently cool down the light engine module (for example, the light valve in the light engine module).

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
a casing, having an inlet and an outlet;
a light source module, disposed in the casing and adjacent to the inlet;
a first fan, disposed in the casing and adjacent to the outlet, and configured to provide a first heat dissipation airflow; and
a light engine module, disposed in the casing and located between the first fan and the light source module, the light engine module comprising a light valve, wherein the first heat dissipation airflow sequentially flows through the inlet, the light source module, the light valve, the first fan, and the outlet, wherein the first fan is disposed between the light engine module and the outlet.

2. The projection apparatus as claimed in claim 1, further comprising a projection lens, wherein the light source module is configured to generate an illumination beam, the light engine module is configured to convert the illumination beam into an image beam, and the projection lens is configured to convert the image beam into a projection beam.

3. The projection apparatus as claimed in claim 2, wherein at least one of an extending direction of a flow path of the first heat dissipation airflow flowing through the light engine module and an axial direction of the first fan is not parallel to an extending direction of the projection beam.

4. The projection apparatus as claimed in claim 2, wherein an extending direction of a flow path of the first heat dissipation airflow flowing through the light engine module and an axial direction of the first fan are perpendicular to an extending direction of the projection beam.

5. The projection apparatus as claimed in claim 2, wherein the the light valve is configured to convert the illumination beam into the image beam.

6. The projection apparatus as claimed in claim 5, wherein the first fan is disposed adjacent to the light valve.

7. The projection apparatus as claimed in claim 1, wherein the light source module comprises a plurality of solid state light sources, and the solid state light sources are located on a flow path of the first heat dissipation airflow.

8. The projection apparatus as claimed in claim 7, wherein the inlet comprises a plurality of sub inlets, and the sub inlets respectively correspond to at least a part of the solid state light sources.

9. The projection apparatus as claimed in claim 7, wherein each of the solid state light sources has a heat dissipation fin set.

10. The projection apparatus as claimed in claim 7, wherein the solid state light sources comprise a blue light source, a green light source, and a red light source.

11. The projection apparatus as claimed in claim 1, wherein the light source module comprises at least one light-emitting diode light source and at least one laser diode light source.

12. The projection apparatus as claimed in claim 1, further comprising:
a circuit board module, disposed in the casing; and
a second fan, disposed in the casing and adjacent to the outlet, and corresponding to the circuit board module, wherein the second fan is configured to provide a second heat dissipation airflow, and the second heat dissipation airflow sequentially flows through the inlet, the light source module, the circuit board module, the second fan, and the outlet.

13. The projection apparatus as claimed in claim 12, wherein at least one of an extending direction of a flow path of the second heat dissipation airflow flowing through the circuit board module and an axial direction of the second fan is not parallel to an extending direction of the projection beam.

14. The projection apparatus as claimed in claim 12, wherein an extending direction of a flow path of the second heat dissipation airflow flowing through the circuit board module and an axial direction of the second fan are perpendicular to an extending direction of the projection beam.

* * * * *